United States Patent [19]
Bieber et al.

[11] Patent Number: 5,673,627
[45] Date of Patent: Oct. 7, 1997

[54] WINDOW ASSEMBLY FOR A MONOCOQUE LOCOMOTIVE

[75] Inventors: Allen Carl Bieber, Erie; Douglas William Miller, North East, both of Pa.

[73] Assignee: General Electric Company, Erie, Pa.

[21] Appl. No.: 704,212

[22] Filed: Aug. 28, 1996

Related U.S. Application Data

[62] Division of Ser. No. 590,799, Jan. 24, 1996, Pat. No. 5,577,449, which is a continuation of Ser. No. 442,244, May 15, 1995, Pat. No. 5,535,680, which is a continuation of Ser. No. 263,369, Jun. 20, 1994, abandoned, which is a division of Ser. No. 59,788, May 10, 1992, Pat. No. 5,355,806.

[51] Int. Cl.$^6$ ........................... E06B 3/00
[52] U.S. Cl. ............. 105/329.1; 105/332; 49/504; 52/208
[58] Field of Search .................. 105/333, 331, 105/337, 338, 339, 329.1, 397, 401, 332; 296/201, 146.15, 146.16, 96.21; 52/204.51, 204.5, 208, 204.55, 214, 213; 49/504, 413

[56] References Cited

U.S. PATENT DOCUMENTS

| | | | |
|---|---|---|---|
| 2,804,182 | 8/1957 | Roos | 49/504 |
| 3,087,537 | 4/1963 | Van | 49/413 |
| 3,796,008 | 3/1974 | Eakin | 49/504 |
| 3,964,783 | 6/1976 | Fisher | 49/504 |
| 4,787,184 | 11/1988 | Boidron | 52/208 |
| 4,894,955 | 1/1990 | Metz | 49/504 |

FOREIGN PATENT DOCUMENTS

| | | | |
|---|---|---|---|
| 473479 | 3/1992 | European Pat. Off. | 52/208 |
| 2661209 | 10/1991 | France | 52/208 |
| 2644645 | 1/1992 | France | 52/208 |
| 2239888 | 7/1991 | United Kingdom | 52/208 |

*Primary Examiner*—Mark T. Le
*Attorney, Agent, or Firm*—Jill M. Breedlove; Marvin Snyder

[57] ABSTRACT

A window assembly for a locomotive is sealingly disposed in an opening within the sidewall of the locomotive and attached to the sidewall to allow limited relative movement of the window assembly with respect to the sidewall without disrupting the seal.

5 Claims, 9 Drawing Sheets

WINDOW ASSEMBLY FOR A MONOCOQUE LOCOMOTIVE

This application is a division of application Ser. No. 08/590,799, filed Jan. 24, 1996 now U.S. Pat. No. 5,577,449, which is a continuation of Ser. No. 08/442,244 filed May 15, 1995 now U.S. Pat. No. 5,535,680, which is a FWC of Ser. No. 08/263,369 filed Jun. 20, 1994 (now abandoned), which is a division of Ser. No. 08/059,788 filed May 10, 1992 (U.S. Pat. No. 5,355,806).

FIELD OF THE INVENTION

The present invention relates to locomotive fabrication, and more specifically to improvements in monocoque-type locomotive design and layout.

Locomotives have provided the power for the transportation of railroad cars carrying people and cargo for many years. It has long been desirable that locomotives provide this transportation power efficiently; however, with the increase in energy prices, the desirability of the efficient production of transportation power has intensified. One well known method for increasing the efficiency is to streamline the exterior of the locomotive so that wind resistance or drag is reduced.

One of the more prevalent types of locomotives is diesel powered locomotives. This type of locomotive typically has a main diesel engine which turns an alternator to generate electrical power. That electrical power is conducted through an system of electrical connectors and controls to a number of electrical engines which drive the individual sets of wheels on the locomotive.

Many of the diesel locomotives are fabricated using a modular assembly system on a platform sometimes referred to as a platform design. In the platform design, individual modules housing the various components of the locomotive are assembled separately from each other. The types of modules may include modules which contain the diesel engine, the electrical generator, assorted electrical controls or the crew compartment. The modules also include a structural system and a covering for the components. After the modules are separately assembled, the modules are fastened along the upper side of a generally flat platform and then interconnected to each other.

Platform design locomotives tend to be heavy and box-like which tends to cause the locomotives to have a high axle load. To increase the ability of a locomotive to meet axle load limitations, a type of locomotive referred to as a monocoque was developed. A conventional monocoque locomotive has a unitary carbody; which provides the structure and the covering for the components. The carbody has a lower platform, two vertical sidewalls, one of which extends along each of the sides of the car body, and a series of bulkheads which are attached to and extend transversely across the platform to form a part of the structural support for the sidewalls.

The sidewalls of the carbody typically consist of a frame of interconnected vertical and horizontal supports. Thin sheet metal plates are overlayed on and attached to the outer surface of the frame. A frontal, streamlined nosepiece and a rear wall are also fashioned from the thin sheet metal.

The unitary carbody provides the necessary structural support for the mounting of many of the components of the locomotive. Also, the sidewalls and nosepiece form a smooth exterior surface for the locomotive which reduces air drag. In addition, the frame and surface sheeting construction of the carbody in the monocoque locomotive reduces the weight of the locomotive over the covering and structural system found in the modular type locomotive.

The sidewalls and bulkheads form individual compartments into which the various locomotive components are constructed or placed. For example, the frontal compartment may include a crew compartment with various controls, the middle compartment may contain a diesel engine and alternator and the rear compartment may contain a radiator and accompany fans or blowers.

In fabricating a conventional monocoque locomotive, the carbody is separately assembled and then the internal components are installed. However, the carbody presents several drawbacks to the installation of the components. First, the carbody limits lateral access to the interior of the locomotive. Therefore, the interior must be accessed from above. To allow such access, the space between the sidewalls of the carbody rearward of the crew compartment is generally open so that overhead lifting devices may lower components onto the platform. However, many of the components installed within the carbody must be protected from the environment. Thus, the locomotive includes a number of removable roof members between the sidewalls or hatches which extend from side wall to sidewall.

A second major drawback is that after a component has been deposited on the platform, the carbody constrains the ability of the installer to freely move the components around the platform for proper alignment and installation.

Because of the limited access, one of the more efficient methods for installing the individual components is to assemble groupings of components on a substrate, and then insert the assembled groupings into the locomotives and attach the substrate to the carbodies.

One of the drawbacks of this method of assembly is that the carbody itself cannot serve as a substrate on which groupings of components can be preassembled before placement in the carbody. In particular, the bulkheads have large surface areas onto which component groupings must be individually attached.

Another drawback of this method of assembly is that the substrates onto which the component groupings are assembled, add weight to the locomotive.

An additional drawback of this method of assembly is that the more volumous the groupings of assemblies are, the more difficult it is to maneuver the groupings within the carbodies for proper alignment and installation.

However, some portions of the carbody, such as the crew compartment, are covered to contribute structural integrity of the locomotive. Therefore, overhead access for installation of these components is non-existent or severely restricted and the constraint of the carbodies to interior movement is a further drawback.

In addition to the installation of the components within the carbody, many of the components which are located within the various compartments must be periodically removed typically for maintenance. Frequently these components are too heavy and/or large to fit through the doors which extend through the sidewalls. By removing the roof hatches, the components may be removed from the carbody with the overhead crane or similar apparatus.

A general drawback of having removable roof hatches is that the interface between the hatch and sidewall may be sealed to prevent environmental elements from intruding into the interior of the various compartments of the locomotive.

A related drawback is that the seal between the roof hatch and sidewall may be established each time the hatch and sidewall are attached.

The sidewalls of the conventional monocoque locomotive include doors and hatches for access to the interior of the carbody and several openings for windows. Among the windows in the openings are the crew window assemblies. There are generally two crew windows, with each of the windows located in the frontal crew compartment along each one of the sidewalls and opposite from each other. The crew windows are used so that the locomotive operator may place his head out of the opening and look rearward to monitor hand signals and visually ascertain the reverse movement of the % locomotive. However, the crew window must also be operable so that it may be shut to prevent wind or rain from entering the crew compartment. To allow crew windows to be opened and shut, the windows are typically constructed with a peripheral frame and disposed within the frame on guiding ribs are a stationary window and a sliding window. The sliding window may be slid open along the guiding ribs to provide the opening for the operator's head.

In attaching the window assemblies to the sidewalls, it is important that the interface between the sidewall and the frame is sealed to prevent wind or rain from traveling through the interface. In the platform design or conventional monocoque locomotives the crew window assemblies are sealingly fixed to the sidewalls by fixedly bolting or welding all the peripheral sides of the frame to the sidewalls. A drawback of this attachment is that the window frame is forced to flex in the same manner as the sidewall.

Monocoque sidewalls undergo flexure when forces are applied to the locomotive car body. Such forces may arise during normal operation of the locomotive, and also when the locomotive is attaching and detaching cars to the train. Fixedly attaching the crew windows to the sidewalls undergoing this greater flex may cause the frame of the window to flex to such a degree that it may become damaged. This damage may prevent the sliding pane from opening or closing properly. In addition, the flexure may cause the glass to break.

However, a drawback of not fixedly attaching the window to the sidewall is that if the window does not flex to the same degree as the sidewall there is relative movement in the interface between the sidewalls and window frame. Sealing this interface against the environment in spite of the relative movement presents a problem.

One of the more important components of the locomotive is the headlights. As is well known, headlights illuminate the area in front of the locomotive and also serve as a visual warning that a train is approaching. Typically a pair of headlights are mounted within sockets formed in a frontal nosepiece of the locomotive. The sockets are configured so that a curved frontal surface of the headlights is exposed to the environment. The headlights are typically pointed slightly downward and inward so that the headlights illuminate the track at a desired distance in front of the locomotive.

In a modular type locomotive, the frontal nosepiece extends in a generally vertical direction; and therefore, the frontal surface of the headlights is generally flush with the nosepiece. However, when the nosepiece is rearwardly slanted, the vertical frontal surface of the headlight is unsightly.

One method of improving the aesthetics of the headlights is to place the headlights in a enclosure having a clear front wall which is flush mounted with the slanted nosepiece of the locomotive. A drawback of this method is that the headlights produce a lot of heat and confining the headlights in an enclosure causes the temperature of the air within the enclosure to rise to a high degree which may reduce bulb life. In addition, the clear front wall is typically plexiglass which acts as an insulator and the side walls are surrounded by insulating type components which causes the temperature to increase even further. Placing ports in the side or rear walls of the enclosure may provide some reduction in the temperature; however, the ports may not create sufficient circulation to appreciably reduce the temperature in the enclosure.

Circulation through the enclosure may be obtained by providing openings in the front wall in addition to the side or rear openings so that wind generates by the movement of the locomotive will force air through the enclosure. A drawback of placing ports in the enclosure is that the openings in the front wall and the side and rear openings allow environment elements to enter the enclosure which may lead to corrosion of the enclosure and the electrical connections contained therein.

Because the locomotive is a moving vehicle, there is always a danger of collision with another object. Historically, collision posts were installed to absorb the forces caused by the collision. These collision posts have been vertical, slightly tapered solid pieces of metal which were welded to the platform. The posts had little, if any, horizontal support other than what was provided by the welded attachment. Thus, to handle the force of the collision, the posts have a large horizontal cross sectional area. However, the large cross sectional area cause the posts to be very heavy, and the heavy weight is a significant drawback.

Accordingly, it is an object of the present invention to provide a method and apparatus for preassembling a grouping of components on at least one of the bulkheads forming part of the carbody.

Another object of the present invention is to provide a method for preassembling a grouping of components on a substrate which does not increase the weight of the locomotive.

A further object of the present invention is to provide a device for moving the components laterally and longitudinally along the platform as the components are being inserted within the carbody.

A yet further object of the present invention is to provide such a device for moving components which control the vertical placement of the components after the components have been properly aligned.

A still further object of the present invention is to provide a locomotive having a device providing for removable attachment of components to a hollow support while preventing deformation of the support. A related object of the present invention is to provide a device for removably attaching roof hatches to the cant rail of a monocoque locomotive without deformation of the cant rail.

A yet further object of the present invention is to provide a sealing device for sealing the seam between the roof hatches and the cant rail.

A further object of the present invention is to provide a window which may be disposed within an opening in a sidewall of a locomotive and attached to the sidewall so that the window does not flex to the same degree as the sidewalls.

A still further object of the present invention is to provide a window having a peripheral frame which is attached to the sidewall of a locomotive in such a manner that the interface between the frame and sidewall is sealed against the environmental elements even when there is relative movement between the sidewall and frame.

A still further object of the present invention is to provide a headlight enclosure apparatus in which the air temperature is prevented from reaching an unacceptable level. A related object is to provide such an enclosure which is sealed against the environmental elements.

A yet further object of the present invention is to provide a headlight enclosure through which air is circulated without requiring the addition of specialized equipment to the locomotive.

Another object of the present invention to provide a locomotive having an improved collision post assembly configured to absorb potential collision forces while weighing less than prior collision posts.

A yet further object of the present invention is to provide a collision post assembly for a locomotive in which the configuration of the assembly distributes and transfers lateral collision forces to a platform forming part of the locomotive.

Other objects and advantages of the invention will be apparent from the following description, the accompanying drawings and the appended claims.

SUMMARY OF THE INVENTION

In carrying out the present invention in preferred forms thereof, a locomotive is provided. The locomotive, preferably the monocoque locomotive, includes a carbody having a lower longitudinally extending generally flat platform. The carbody includes a pair of sidewalls with each sidewall extending along at least a portion of the platform. The carbody also includes a nosepiece which extends from sidewall to sidewall across the front of the platform and has a rearwardly inclined upper portion. A series of roof hatches extends transversely across the platform from sidewall to sidewall along portions of the carbody.

The locomotive also includes an attachment assembly for removably attaching the roof hatch and other components to the sidewall while preventing deformation of the sidewall due to force applied by the attachment on the sidewall. More particularly, the attachment assembly of the present invention is embodied in a sleeve which extends through a horizontal cant rail of the sidewall. A bolt extends upward through the sleeve and is threaded into a nut attached to the roof hatch.

In addition, the locomotive includes a bulkhead extending transversely across and attached to the platform and sidewalls, the bulkhead including an attached portion which has a vertical plate rigidly connected to the platform with the platform, sidewall and the attached portion forming an opening. An insert portion of the bulkhead is preassembled with at least one component attached to a planar substrate of the insert portions. The insert portion is disposed within the opening with the insert portion having a planar substrate which is rigidly attached to the vertical plate of the attached portion to form a unitary bulkhead.

The locomotive also includes a window assembly disposed within an opening formed in the sidewall. Portions of the window assembly are attached to the sidewall with positioning devices which allow limited coplanar movement of the window assembly relative to the sidewall. The window assembly also has a sealing component located in the interface between the window assembly and the sidewall for sealing the interface during the relative movement between the assembly and sidewall.

More particularly, the window assembly of the present invention is embodied in a peripheral frame disposed in the opening in the sidewall. The peripheral frame has a first flange extending horizontally inward through the sidewall and a peripheral skirt attached to the first flange and extending outward from the first flange, coplanar with the exterior of the sidewall to form an interface between the skirt and sidewall. The window assembly also including a plurality of positioning devices attached about a portion of the periphery of the frame with each positioning device contacting the sidewall for positioning the peripheral skirt relative to the sidewall so that the interface is a desired width, the positioning device allowing limited relative coplanar movement between the skirt and the sidewall and rigidly attaching another portion of the periphery the peripheral flange to the sidewall.

The locomotive also has a headlight assembly disposed within the nosepiece of the locomotive. The headlight assembly has an enclosure and a device for circulating air through the enclosure to reduce a temperature rise in the enclosure due to the headlights located therein.

More particularly, the headlight assembly of the present invention is a frontal transparent plane flush mounted with the nosepiece. The pane is mounted to the front of a housing to form an enclosure with the circulating device including an air supply which extends into the enclosure to supply a desired flow rate of pressurized air into the enclosure and an air exit extending through the enclosure for allowing the supplied air to flow out of the enclosure to create the circulation.

Further, the locomotive includes a collision post assembly located in close proximity to the frontal nosepiece and which includes a frontal section for absorbing collision forces and transferring the forces generally longitudinally to a rearward support section which transfers the forces received from the frontal section to the platform. Disposed between and rigidly attached to the frontal and rearward section is a vertical front plate with the frontal section and rearward section fixedly supporting the front plate. The front plate is rigidly attached to an operator's cab plate which is in turn rigidly attached to the structural system of the carbody.

Another aspect of the present invention is embodied in a skate assembly for use in horizontal and vertical movement and placement of components on or within the platform of a locomotive. More particularly, the skate assembly of the present invention is embodied in a roller device which provides multi-directional movement. Attached to the roller device is a clamp device which positively holds the component and allows selective vertical fixation and placement of the component.

DESCRIPTION OF THE DRAWINGS

FIG. 14 is a vertical sectional view taken along line 14—14 of FIG. 13 of a collision post suitable for use in the locomotive of FIG. 1a;

DESCRIPTION OF PREFERRED EMBODIMENTS

Figure 1:
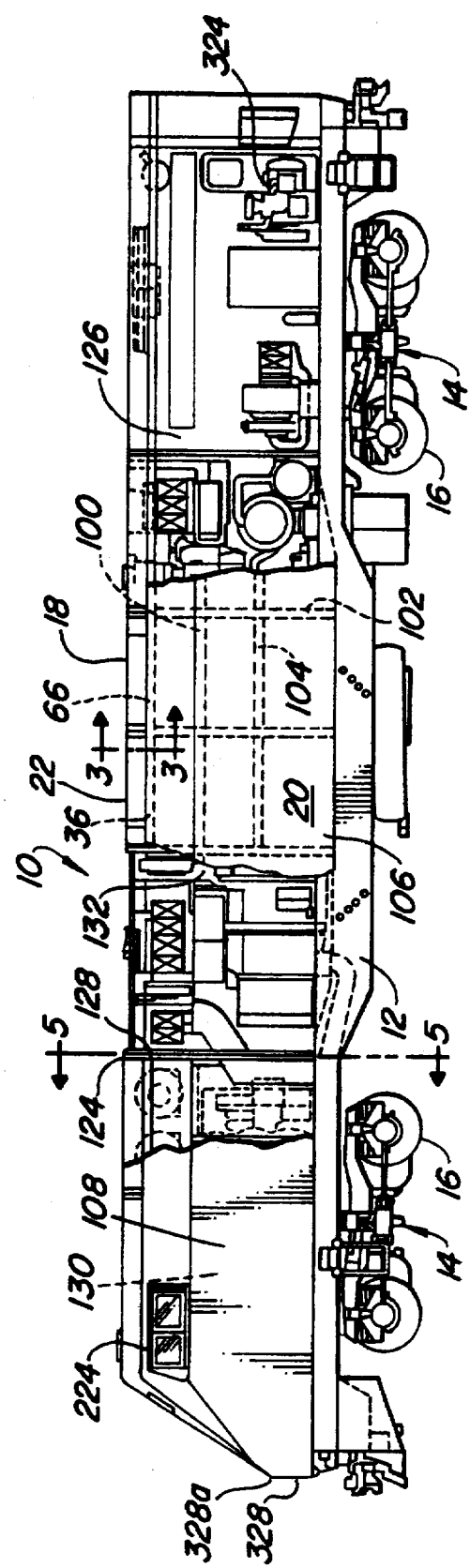
FIG. 1 is a side elevational view with parts broken away of a locomotive.

Referring to FIG. 1, a longitudinally extending locomotive is generally indicated at 10. The locomotive 10 is of a type generally referred to as a monocoque locomotive, and has a horizonal, generally flat platform 12. The platform 12 is mounted on a pair of trucks 14 having a set of rotatably mounted railroad wheels 16. The platform 12 forms a lower portion of carbody 18. The carbody 18 has a pair of sidewalls 20 which extend along the sides of the platform 12.

Figure 3:
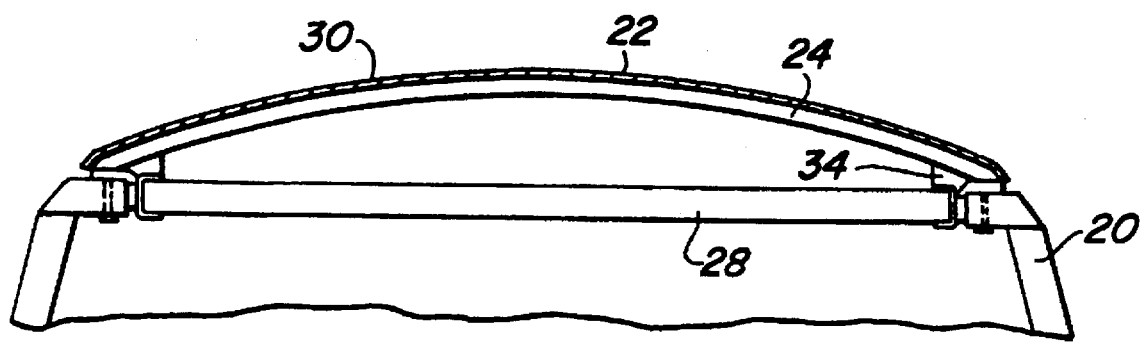
FIG. 3 is a partial vertical section of a roof hatch and sidewall of FIG. 1, taken along the line 3—3 of FIG. 1 and in the direction generally indicated.

The carbody 18 includes a number of roof hatches 22 which extends transverse across the platform 12 from sidewall 20 to sidewall. Referring to FIG. 3, the roof hatches 22 include a plurality of upwardly curved arch supports 24 and attached horizontal truss supports 28. The arch supports 24 and truss supports 28 are spaced longitudinally along and extend transverse across the platform 12. The roof 30 is a thin metal sheet which is attached to the upper surfaces of and supported by the arch supports 24.

Figure 4:
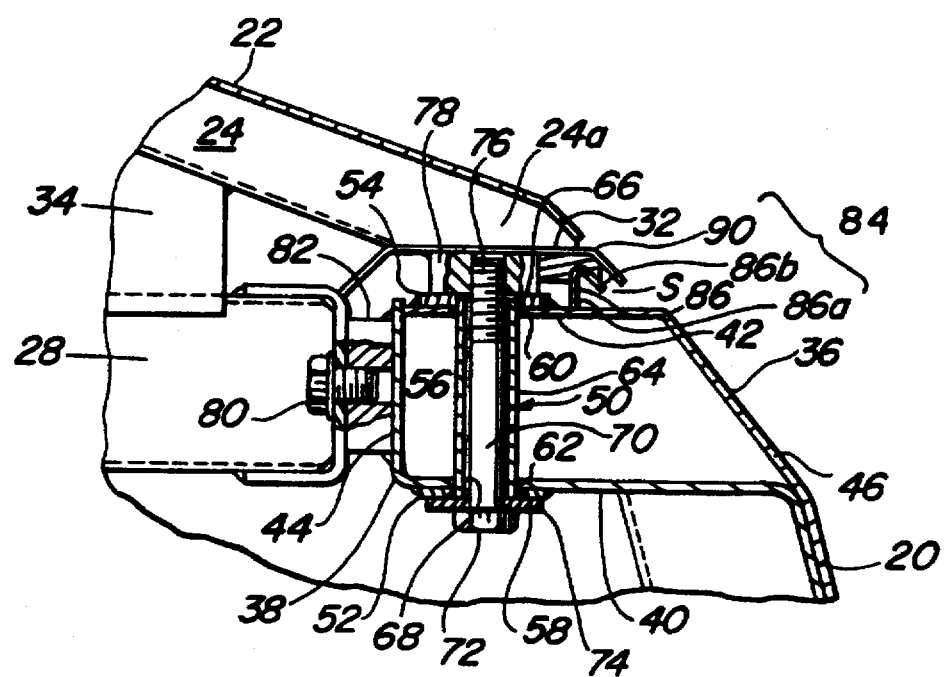
FIG. 4 is a partial enlarged view of one of the sides of the view of FIG. 3 illustrating a connection device suitable for use in the locomotive of FIG. 1.

Referring to FIG. 4, the roof hatch 22 also includes a pair of downwardly opening channels 32 each of which are attached to and extend longitudinally along the roof hatch to interconnect the ends 24a of the arch supports 24 for each roof hatch. The channel 32 is also attached to the truss supports 28. A downwardly extending flange 34 attaches the end of the truss support 28 to the arch support 24.

The sidewalls 20 include a horizontally extending cant rail 36 which extends along at least a portion and preferably the entire length of the locomotive 10. The cant rail 36 is generally trapezoidal in transverse cross section and has a portion 38 which extends inward over the platform 12 (FIG. 1) in a cantilever fashion. The cant rail 36 includes a lower wall 40 and a parallel upper wall 42. The cant rail 36 also includes a vertically extending inner sidewall 44 and outer sidewall 46, which supportably connect the lower wall 40 to the upper wall 42. The upper wall 42 and lower wall 40 are relatively thin and may have a general thickness of about 4 millimeters. Thus, localized force, particularly in the vertical direction, on the lower wall 40 or upper wall 42 may cause deformation of those Walls.

To removably connect the cant rail 36 to a component at the locomotive 10 such as the roof hatch 22 without deforming the cant rail, an attachment assembly generally indicated at 50 and embodying the present invention is provided. The attachment assembly 50 includes a lower mounting place 52 disposed coplanar with and rigidly attached to the lower wall 40 of the cant rail 36 preferably by welding, and an upper mounting place 54 disposed coplanar with and rigidly attached, preferably by welding, to the upper wall 42. The upper mounting plate 54 forms a circular center opening 56 which is vertically aligned with a circular central opening 58 in the mounting plate. The upper wall 42 forms a circular opening 60 which is coaxially aligned with the opening 56 in the upper mounting plate 54 and the opening 58 in the lower mounting plate 52. Similarly the lower wall 40 of the cant rail 36 has a circular opening 62 similar in size to the opening 60 in the upper wall 42 and vertically aligned with opening 60.

The attachment assembly also includes a tubular sleeve 64 which extends vertically through the opening 60 in the upper wall 42 and the opening 62 in the lower wall 40 and has an upper end 66 which extends within the opening in the upper mounting plate 56 and is rigidly attached to the upper washer, preferably by welding. A lower end 68 of the tubular sleeve 64 extends within the opening 58 in the lower mounting plate 52 and is rigidly connected to the lower washer, preferably by welding. Extending upward through the sleeve 64 is a removable connector such as a bolt 70. The bolt 70 includes a lower head 72. A flat washer 74 circumscribes the bolt 70 and is disposed between the head 72 and lower washer 52. An upper end 76 of the bolt 70 is threaded into a member configured to removably connect to the upper end of the bolt such as a nut or tap block 78 operably attached to the component mounted to the cant rail 36 such as the channel 32 of the roof hatch.

The truss support 28 is removably attached to the cant rail 36 by bolt 80 which extends through the end of the truss support and is received in a nut 82 attached to the inner sidewall 46 of the cant rail 36.

When the roof hatch 22 is removably attached to the cant rail 36, the channel 32 and upper wall 42 form a seam S. To prevent environmental elements, such as water from intruding into the carbody 18 through the seam S, a sealing mechanism indicated at 84 is provided. The sealing mechanism 84 includes an angle rib 86 having a thin solid lower vertically extending section 86a which is attached to and extends longitudinally along the upper wall 42 of the cant rail 36. The angle rib 86 also includes an upper lip 86b which extends downward and outward and generally parallel to the outer side 32a of the channel 32. A compressible gasket 90 is fixedly attached to the channel 32 and placed on the channel so that the gasket is vertically aligned with the angle rib 86. The angle rib 86 compresses the gasket to seal the seam S.

In operation, the roof hatch 22 is aligned with and positioned over the sidewalls 20 so that the tap block 78 is aligned with the tubular sleeve 64. The flat washer 74 is positioned to circumvent the bolt 70 and the bolt is inserted upward through the tubular sleeve 64 and threaded into the tap block 78. Bolt 70 is threaded into the tap block 78 until the tap block contacts the upper mounting plate 54 and the flat washer 74 contacts the lower mounting plate 52. Continued rotation of the bolt 70 applies a clamping force between the roof hatch 22 and cant rail 36 and causes the flat washer 74 to exert an upward force against the lower mounting plate 52 and the tap block 78 to exert an oppositely directed force against the upper mounting plate 54. The upper mounting plate 54 distributes the downward force about the upper wall 42 of the cant rail 36. Similarly, the lower mounting plate 52 distributes the upwardly directed force about the lower wall 40 of the cant rail. In addition, tubular sleeve 64 acts as a vertical support to maintain the relative position of the upper wall 42 and the lower wall 40 and prevent compression of the upper wall and lower wall so that roof hatch 22 can be boltedly connected to the cant rail 36 with sufficient clamping force without causing deformation of the cant rail.

As the roof hatch 22 has been attached to the sidewalls 20, the angle rib 86 compresses a portion of the gasket 90 to form the seal.

Although the attachment assembly 50 has been described as being employed to connect the roof hatch 22 to the cant rail 36, the connection device may be used also to removably connect any element of the locomotive to the cant rail without causing deformation of the cant rail.

Referring back to FIG. 1, the cant rail 36 is one of a number of horizontal supports 100 which are attached to vertical supports 102 and form a frame 104 for the carbody 18. Attached to the exterior of the frame 104 is a plurality of thin metal sheets 106 which form the exterior surface 108 of the carbody. The carbody 18 also includes a series of bulkheads 124, each of which extend transversely across the platform 12 from sidewall 20 to sidewall. The bulkheads 124 are attached, preferably by welding, to the sidewalls 20 and platform 12 to separate the carbody 18 into compartments 126 and provide structural support to the carbody principally by acting as a brace to the cant rails 36 in the sidewalls 20. The bulkheads 124 include a forward bulkhead 128 which separates a crew compartment 130 from an engine compartment 132.

Figure 5:
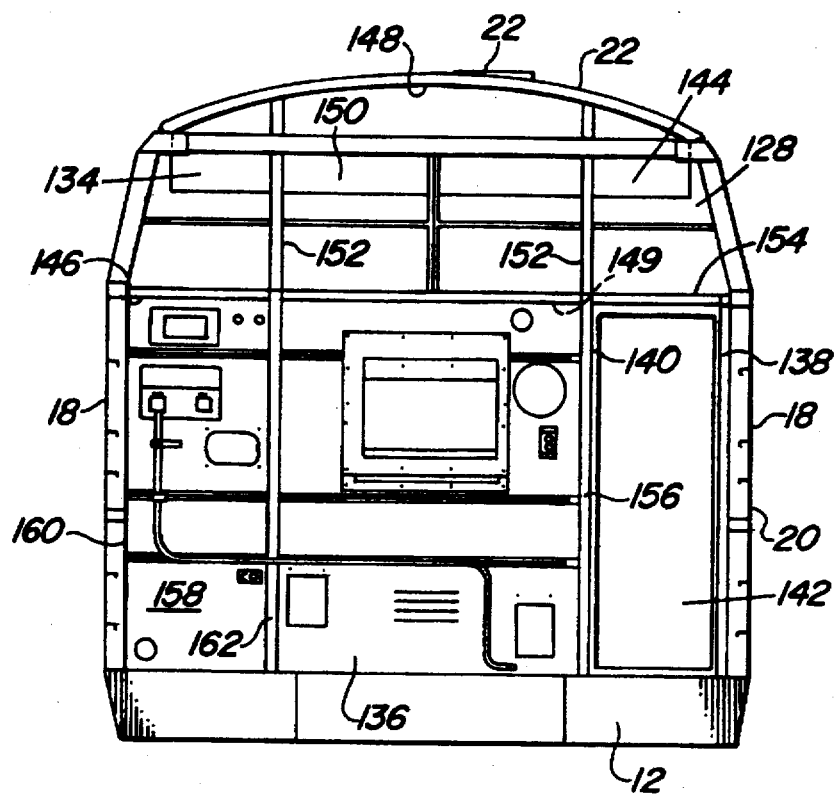
FIG. 5 is a vertical section of a bulkhead suitable for use in the locomotive of FIG. 1, taken along the line 5—5 of FIG. 1 and in the direction generally indicated.

Referring to FIG. 5, the forward bulkhead 128 includes an attached portion 134 and an insert portion 136. The attached portion 134 includes a lower section 138 which forms a door frame 140 in which a door 142 is mounted. The attached portion 134 also includes an upper section 144 which has a lower generally horizontal edge 146 and upper edge 148 which is configured to contact the inner surfaces of the sidewall 20 and roof hatch 22. The attached portion 134 is attached to the platform 12 and sidewall 20. Also, the attached portion 134 of the bulkhead 128 and the platform 12 and sidewall 20 form an opening 149.

The upper section 144 includes a vertical plate 150 and a set of vertically extending supports 152 which are welded to the rearward surface of the plate. Also welded to the plate 150 and extending along the lower edge 146 of the upper section 144 and the top of the door frame 140 is a horizontally extending support 154. Extending vertically along inner side 140a of the door frame 140 is a vertical support 156 which is integrally attached to one of the vertical supports 152 on the upper section 144.

The insert portion 136 of the forward bulkhead 128 is disposed in the opening 149 and includes a plate 158 which is aligned with the plate 150 of the upper section 144 so that plate 158 and plate 150 are in the same plane. The plate 158 having an outer peripheral edge 160 which is attached, preferably by welding, to the attached portion 134, the sidewall 120 and the platform 112 so that plate 158 and plate 150 form a unitary piece. On the rearward side of the plate 158 is a vertical support 162 which is aligned with and attached to one of the vertical support 152 on the upper section 144.

Figure 6:
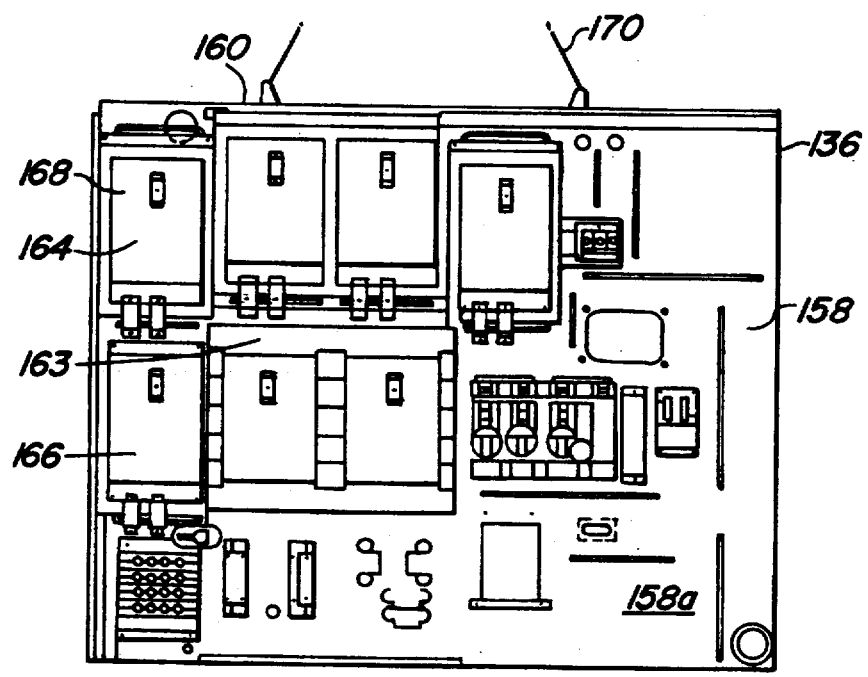
FIG. 6 is a front elevational view of an insert portion of the bulkhead of FIG. 5.

Referring to FIG. 6, the forward surface 158a of plate 158 of the insert portion 136 forms a substrate 163 for the mounting of a grouping of control components 164. These components 164 typically include such components as an alternate field regulator 166 and a blower field regulator 168 as well as other types of components.

Referring to FIGS. 5 and 6, in operation the sidewalls 20 are attached to the platform 12. The attached portion 130 of the forward bulkhead 128 as well as the other bulkheads 124 are attached to the platform 12 and sidewalls 20 to provide structural support for the carbody 18. In a location remote from the carbody 18, the assembly of components 164 is mounted on the substrate 163 of the insert portion 136 of the forward bulkhead 128.

A lifting device 170 such as an overhead crane with attached harness lifts the insert portion 136 and assembled components 164 and positions the insert portion over the platform 12 and just forward of the attached portion 134. The lifting device 170 then lowers the insert portion 136 until it is positioned between the upper section 144 and the platform 12 and the lower section 138 and the sidewall 20.

The insert portion 136 is then moved toward the rear of the locomotive 10 until the plate 158 of the insert portion 136 is aligned with and generally forms a single plane with the plate of the upper section 144. The peripheral edge 160 of the insert portion 136 is then welded to the attached portion 134, platform 112 and sidewall 120 to complete the forward bulkhead 128. When the insert portion 136 is attached to the attached portion 134, the attached and insert portions form a unitary piece of the structural system of the locomotive 10 in that forces applied to either the attached portion 134 or insert portion 136 are transferred throughout the bulkhead 128 as if the bulkhead did not have two sections.

The vertical support system 162 on the insert portion 136 is attached to one of the vertical supports 152 on the attached portion 134. The assembled component 164 are then connected to various electrical and signal connectors (not shown) within the locomotive.

Figure 16:
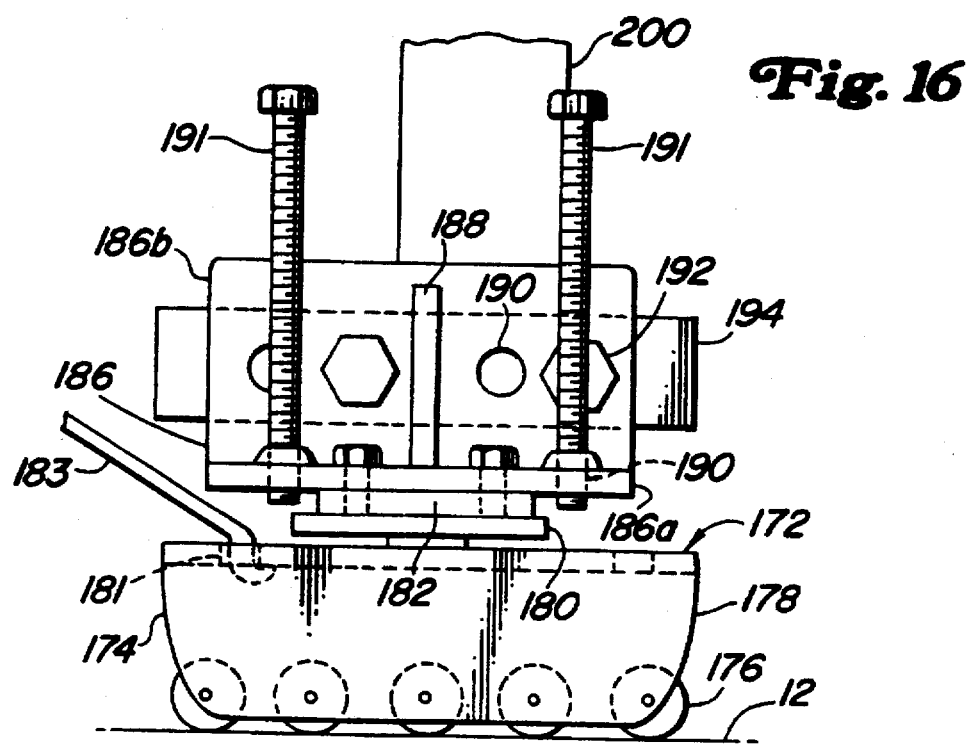
FIG. 16 is a side elevational view of a skate assembly of the present invention.
Figure 17:
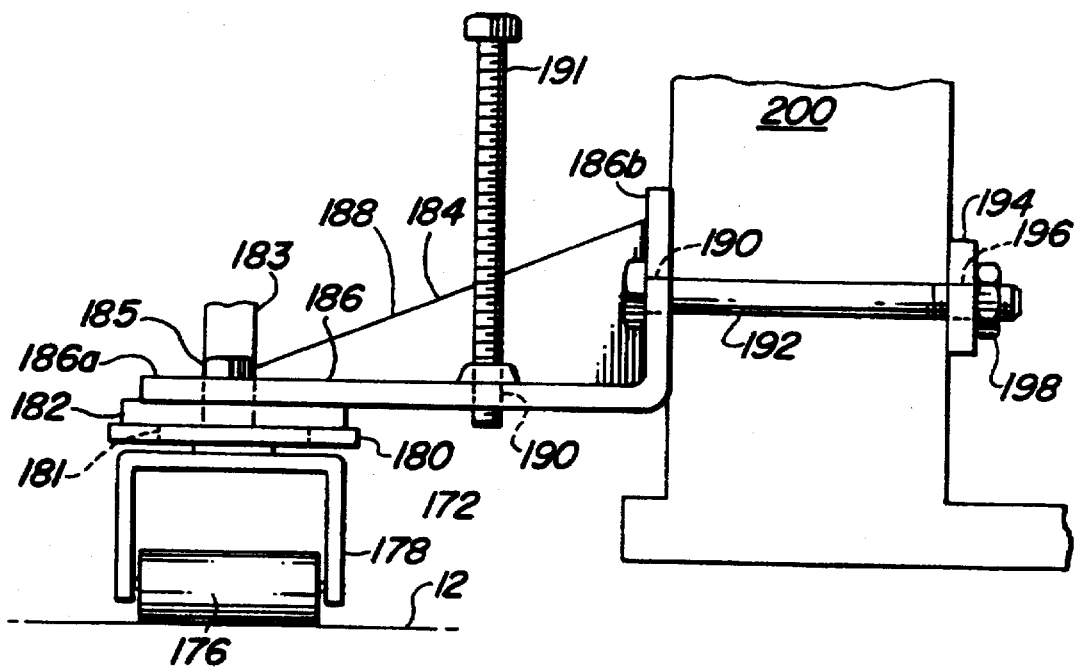
FIG. 17 is a frontal elevational view of the skate assembly of FIG. 16.

Referring to FIGS. 16 and 17, the skate assembly for moving components once the components have been placed on the platform 12 of the present invention is generally indicated at 172. The skate includes a roller device 174 which has a series of aligned rollers 176 rotatably mounted in a housing 178. Rotatably mounted in the top of the housing 178 is a horizontal plate 180. The roller 174 supports a large vertical load and provides roller-like movement in the direction of the alignment of the rollers 176. In addition, the horizontal plate 180 is positioned with a low vertical height. One preferred roller device being a HILMA® swivel locking plate roller. The housing 178 forms a set of holes 181 so that a rod 183 may be removably inserted in the hole. Force applied to the rod 183 in the lateral direction applies a torque to the roller device 174 so that the roller may be rotated while carrying the vertical load so that the direction of alignment of the roller 176 may be varied by varying the alignment of the rollers 176 the direction of rolling can be selected. A plate 182, configured to threadingly receive bolts, is rigidly mounted flush to the horizontal plate 180.

Boltedly and removably attached by bolts 185 to the plate 182 is a bracket assembly 184 which has an angle piece 186 having a lower generally horizonal section 186a rigidly connected to a vertical section 186b. A triangular vertical angle piece 188 is rigidly attached and extends between the horizontal section 186a and the vertical section 186a to provide lateral additional support to the vertical section.

The horizontal section 186a forms two vertical threaded holes 190. A vertical jacking bolt 191 extends through each of the holes 190 and is threaded for threaded movement through the holes. The jacking bolts 191 are sized so that they may carry the projected weight of the vertical load applied to the skate assembly 172.

The vertical section 182b of the bracket assembly 184 has a series of horizontally aligned holes 190. Extending through at least two of the holes 190 is a pair of mounting bolts 192. The mounting bolts 192 extend horizontally through a vertical clap bar 194 having holes 196 arranged similar to the holes 190 in the vertical section 182b. The vertical section 182b and clamp bar are aligned and spaced to define a mounting area 196. Nuts 198 are threaded on the end of the mounting bolts 192. Rotation of the nuts 198 allows the distance of the mounting area 196 between the vertical section 182b and clamp bar 194 to be selectively varied. In addition, the set of holes 190 in the vertical section 182b and the set of holes 196 in the clamp bar 194 allow the spacing of the mounting bolts 192 to be varied.

In operation, a component 200 to be installed in the locomotive 10 is lifted off the floor by an overhead lifting device (not shown). A lower element 200 of a component such as a foot is fixedly clamped in the bracket assembly 184 between the vertical section 186b and the clamp bar 194 between the mounting bolts 192. Similarly, skate assemblies 172 are positioned on the component 200 at locations needed to provide stability to the component. The component 200 is then transported to the locomotive 10 and deposited on the platform 12 between the sidewalls 20.

The roller 174 is then rotated so that the rollers 176 are aligned in the direction of desired travel. The component 200 is then rollingly transported on the skate assemblies 172 toward the desired location for the component. Should the direction of transport need to be altered, the rod 183 is inserted in one of the holes 181 in the housing 178 and the roller 178 is rotated to the desired direction. The low vertical height of the roller 128 allows the skate 172 to support the component without causing the clearance height of the component to be measurably increased so that the component may be transported beneath low overhangs in the carbody 18.

After the component 12 has been transported to a location, the component 12 is then selectively positioned at the desired position. After the component 200 is positioned, the jacking bolts 191 are extended downward by rotation of the bolts until the end contacts the platform 12 and slightly lifts the roller 174. The contact between the jacking bolts 191 and the platform 12 positively locates the component 200 and prevents further movement along the platform.

The rollers 174 are then disconnected from the bracket assembly 184 and removed. The jacking bolts 191 are then rotated to selectively lower the component 200 to a desired vertical height. When the component 200 reaches the desired vertical height, the rotation of the jacking bolts 191 is stopped and the jacking bolts 191 maintain the selected vertical height of the component until the component has been attached to the locomotive 10 such as by welding.

Referring to FIG. 1, the sidewalls 20 of the locomotive 10 flex during operation of the locomotive 10. Disposed within the sidewalls 18 adjacent the crew compartment 130 are two crew window assemblies 224. One of the window assemblies 224 is located in each of the sidewalls 20 of the crew compartment 130, and the two window assemblies are located transversely opposite from each other.

Figure 7:
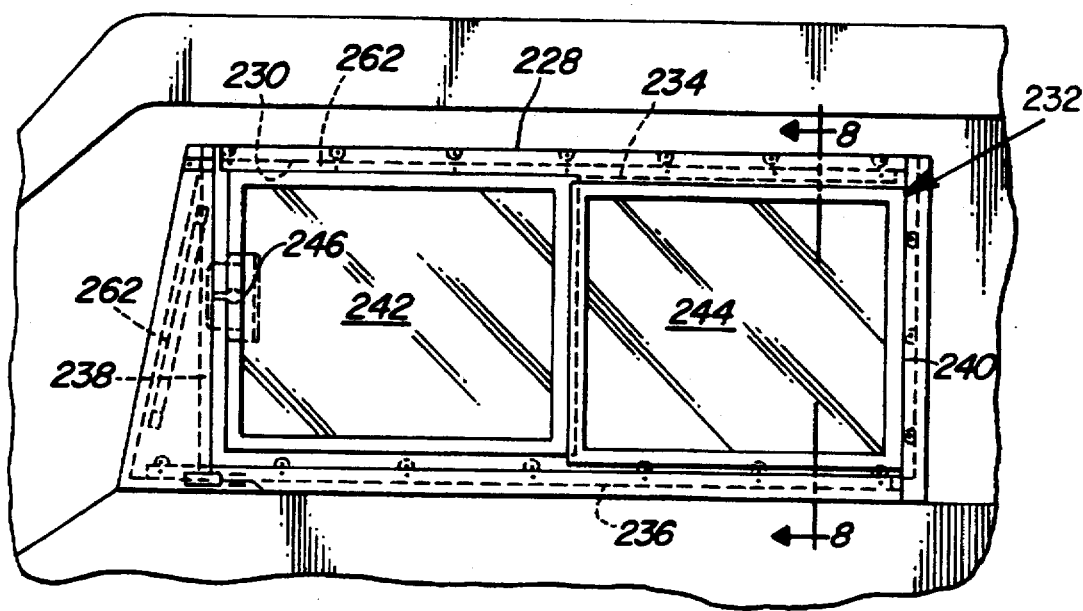
FIG. 7 is a partial enlarged elevational view of a window assembly suitable for use in the locomotive of FIG. 1.
Figure 8:
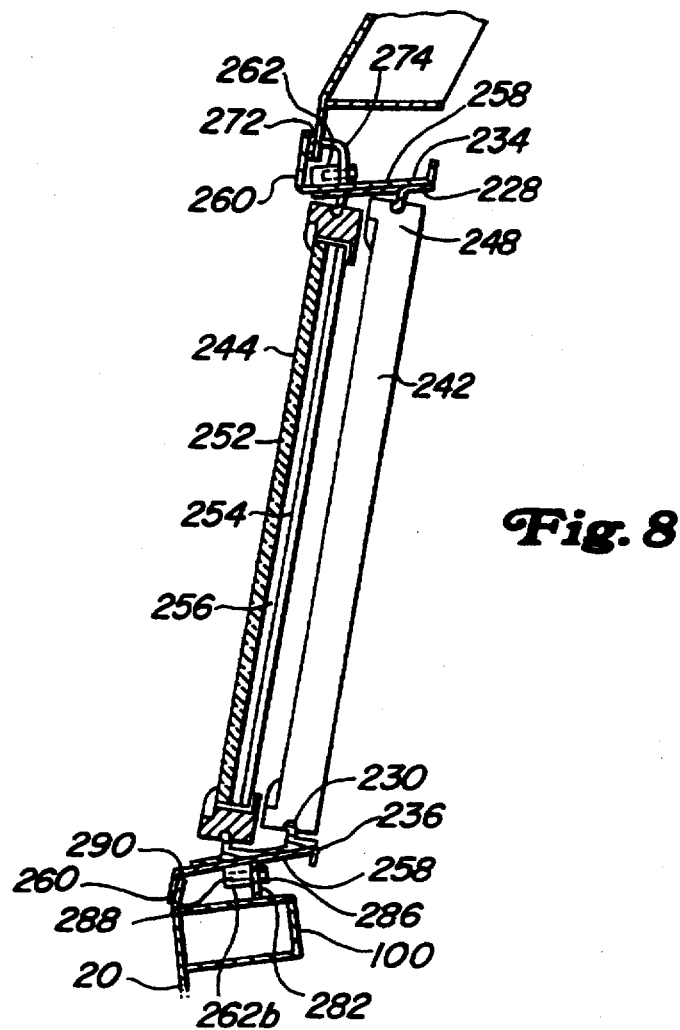
FIG. 8 is a vertical sectional view of the window assembly of FIG. 7, taken along the line 8—8 of FIG. 7 and in the direction generally indicated.

Referring to FIGS. 7 and 8, the window assembly 228 is disposed in opening 230 formed in the sidewall 220. The window assembly 228 includes a peripheral frame 232 having an upper side 234, a lower side 236, a forward side 238, and a rearward side 240. Within the frame 232 is a sliding window 242 and a fixed window 244. Attached to the sliding window 242 is a mechanism 246 for locking the sliding window to the forward side 238 of the frame 232.

The sliding window 242 is mounted on an upper guide 248 and a lower guide 250. The upper and lower guides 248 and 250 allow the sliding window to be moved in a longitudinal direction so that the window assembly 228 may be opened and shut. The sliding window 242 and fixed window 244 include an outer pane 252 of tempered glass and an inner pane 254 of heat strengthened laminated glass. Formed between the outer pane 252 and inner pane 254 is an air gap 256.

The frame 232 includes a flange 258 which extends generally horizontally inward through the sidewall 18. Integrally attached to the outer end of the flange 258 and extending generally vertically outward from the flange 258, coplanar with the exterior surface of the sidewall 20, is a peripheral skirt 260.

Figure 9:
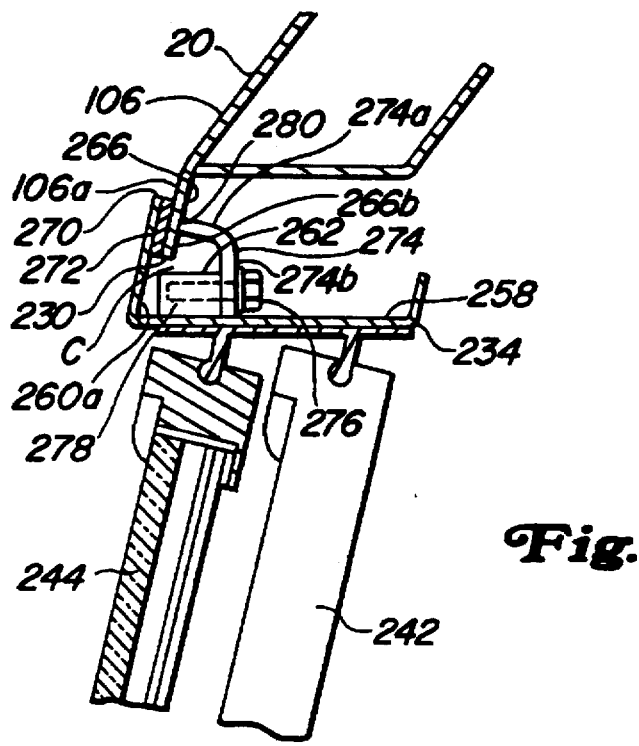
FIG. 9 is a partial enlarged view of the upper end of the view of FIG. 8.

Rigidly attached, preferably by welding, to the outer surface 258a of the flange 258 and extending along the upper side 234, lower side 236, and rearward side 240 of the peripheral frame are tap blocks 262. On the forward side 238 of the peripheral frame 232, the tap block 262 is attached to the peripheral skirt 260. On the forward side 238, upper side 234 and rearward side 240 the tab blocks 262 are mounted in close proximity to skirt 260. Referring to FIGS. 8 and 9, the tab blocks 262 on the forward side 238, upper side 234, and rearward side 240 are positioned so that tap blocks form a small clearance "C" between the blocks and the exterior plate 106 of the sidewall 20.

The peripheral skirt 260, is configured so that the skirt overlaps an edge portion 266 of the plate 106 of the sidewall 20 about the perimeter of the opening 230. The outer surface 106a of the plate 106 and the inner surface 260a of the peripheral skirt 260 form an interface 270 having generally coplanar sides.

Attached to the tap block 262 and spaced about the forward side 238, upper side 234, and rearward side 240 of the window assembly 228 is a series of positioning devices or clamps 274. Each set of clamps 274 includes an outer portion 274a and an inner portion 274b which is attached to the tap block 262 by bolts 276 which are threaded into tapped holes 278 in the block. The clamp 274 is configured so that when the inner portion 274b makes flush contact with the tap block, an outer tip 280 of the outer portion 274a contacts an inner surface 266b of the edge portion 266 and positions the peripheral skirt 260 relative to the plate 106 so that a desired width is formed in the interface 270 between the plate 106 and skirt 260. The point contact of the clamp 274 on the edge portion prevent the width of the interface 270 from exceeding the desired width, but allows limited relative coplanar movement between the skirt 260 and plate 106.

Disposed within this interface is a sealing putty or sealer 272, preferably an RTV sealer or alternative non-rigid sealer, for sealing the interface to prevent the intrusion of the elements into the crew compartment 222. The sealer 272 provides a water tight seal between close adjacent coplanar surfaces, but the sealer allows limited movement while maintaining the seal, particularly in a direction coplanar with the surfaces. The desired or preferred width of the interface 270 and therefore the cross sectional thickness of the sealer 272 is 0.04–0.05 inches.

Referring to FIG. 8, the tap block 262b on the lower side 236 of the frame 232, abuttingly contacts a generally vertical flange 282 which extends along and is rigidly attached to one of the horizontally extending supports 100 in the sidewall 20. The tap block 262b is attached to the vertical flange 282 by a series of bolts 286 which extend through the flange and are received in threaded holes 288 in the tap block. Also, the tap block 262b is positioned so that when the vertical flange 282 contacts the tap block, the peripheral skirt 260 is compressed against the edge portion 266 of the plate 106. Disposed between the skirt 260 and flange edge portion 22 is a sealing gasket or sealing putty 290.

Referring to FIGS. 8 and 9, in operation a desired thickness of sealer 272 is placed on the outer surface 266a of the edge portion 266 about the periphery of the opening 230. The peripheral frame 230, the mounted sliding window 242 and fixed window 244 is then inserted into the opening 230 until the inner surface 260a of the peripheral skirt 260 contacts the sealer 272 and the tap block 262 on the lower side 236 of the frame contacts the vertical flange 282. The tap block 262 on the lower side 236 is then bolted to the vertical flange 282 with bolts 286. The clamps 274 are then installed by bolting the clamps to the tap blocks 262 about the forward side 238 rearward side 240 and upper side 234 of the peripheral frame. As the clamps 274 are being bolted to the tap blocks 262, the outer tip 280 of the clamp contacts the inner surface 266b of the edge portion 266 and urges the skirt 260 toward the edge portion. When the lower portion 274b of the clamp 274 contacts the tap block the exterior plate 106 is positioned so that the width of the interface is a desired width and the sealer 272 forms the environmental seal between the window assembly 238 and the side wall 220.

As the locomotive 210 is being operated, the sidewalls 220 flexes. As the sidewalls 220 flex, the lower side 236 of the frame 232, which is rigidly attached to the sidewall, moves in the same manner as the sidewall. However, the clamps 274 position the upper side 234, forward side 238 and rearward side 240 of the window assemblies 228 relative to the sidewalls 20 so that the sidewall and window assembly 228 are not separated by more than the desired thickness of the interface 270. However, the clamps 274 allow limited, relative coplanar movement between the peripheral skirt 260 of the window assembly 230 and the sidewall 20. Thus, the window assembly 230 may flex to a lesser degree than the sidewall 20. But, the sealer 272 environmentally seals the interface 270 so that the elements can not enter the crew compartment.

Figure 12:
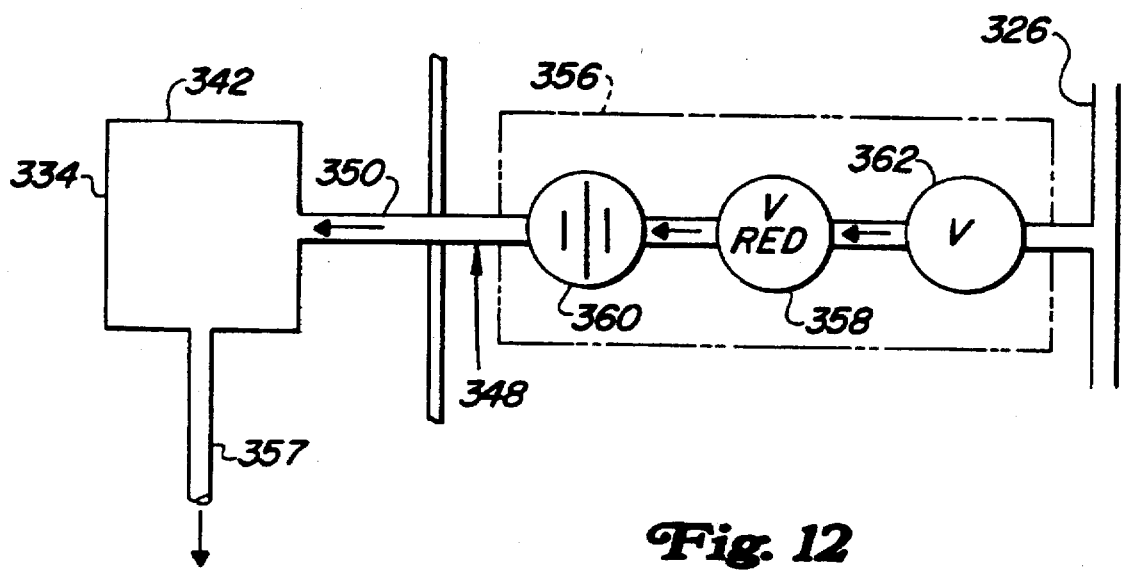
FIG. 12 is a schematic view of a headlight assembly cooling system of the headlight assembly of FIG. 10.

Referring to FIG. 1, within the carbody 18 are many of the components needed to power and control the locomotive 10. Included among these components is an air compressor 324 which supplies high pressure air (typically 120–140 psi) to a pressurized air system 326 (FIG. 12). The air system 326 may extend along the entire length of the locomotive 10 and supplies air for various pneumatic devices for the locomotive.

Figure 2:
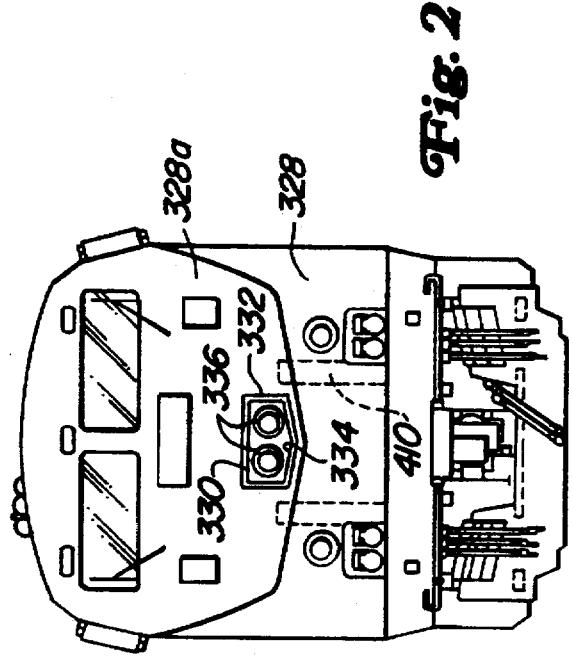
FIG. 2 is a front elevational view of the locomotive of FIG. 1.
Figure 10:
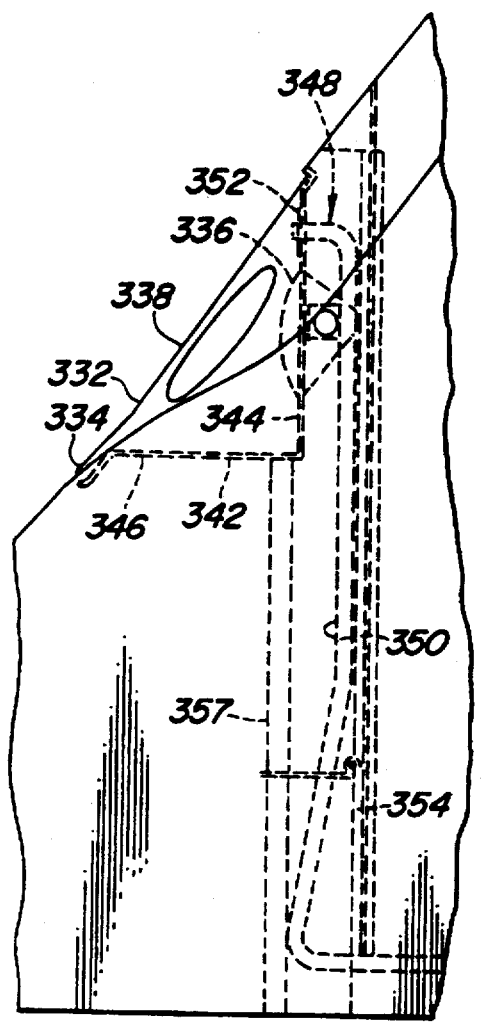
FIG. 10 is a partial enlarged side elevational view of a headlight assembly suitable for use in the locomotive of FIG. 1.
Figure 11:
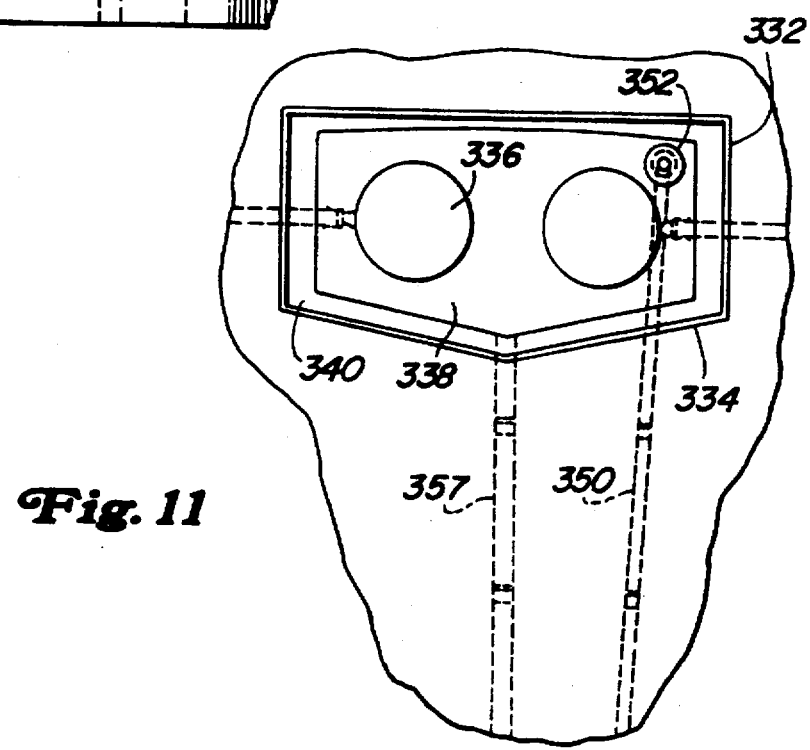
FIG. 11 is a partial enlarged front elevational view of the headlight assembly of FIG. 10.

Referring to FIG. 2, the carbody 18 also includes a frontal nosepiece 328 having an upper portion 328a which is slanted rearward. Formed in the upper portion 328a is an opening 330. Disposed in the opening 330 is a headlight assembly 332. Referring to FIGS. 10 and 11, the headlight assembly 332 includes an enclosure 334 in which a pair of headlights 336 is mounted. The enclosure 334 has a frontal transparent wall or pane 338 housed in a frame 340 which is bolted to a housing 342 which may be formed in the frontal nosepiece 328. The pane 338 is mounted flush with the slanted portion 328a of the nosepiece 328 (FIG. 2) to reduce air drag.

Referring to FIG. 10, the housing 342 includes a vertical rear wall 344 in which the headlights 336 are mounted. The housing 342 also includes a horizontal bottom wall 346 integrally connected to the rear wall 344. Extending through the rear wall 344 above the headlights 336 is a circulation air delivery device indicated generally at 348. The air device 348 includes a thin metal tube 350 extending through the rear wall 344 and connected to the rear wall by common tube connecter 352. Rearward of the rear wall 344, the tube 352 curves and extends downward along the front surface of a front or collision plate 354 which protects the crew compartment from objects which may collide with the locomotive. Just above the platform 12 the tube curves rearward and extends through the collision plate 354 where the tube is connected to an air modulating system 356 (FIG. 12).

The air device 348 also includes an air exit tube 357 which extends through the bottom wall 346 of the housing 342. The air exit tube 357 extends vertically downward through the platform 12 (FIG. 1) where the bottom end is open to the environment. The upper end of the air exit tube 357 is flush with the bottom wall 346 so that the exit tube functions to drain away any water which may enter the enclosure 334. The long vertical length of the exit tube 357 prevents water from travelling up the tube and entering the enclosure 334.

Referring to FIG. 12, the air modulating system 356 is connected to the high air pressure system 326 and functions to reduce the pressure of the air and also control the flow of air entering the tube 350 from the high pressure system. The air modulating system 356 includes a pressure reducing valve 358 and an orifice 360. The pressure reducing valve 358 preferably reduces the pressure of the air from the high pressure system. The orifice 260 regulates the flow of air into the tube 350. Upstream of the pressure reducing valve 358 is a shut off valve 362, to allow the user to shut off the air delivery device 348.

In operation, the shut-off valve 362 is actuated to allow high pressure air from the high pressure supply system 326 to flow into the air modulating system 356. The air flows through the shut-off valve 362 and into pressure reducing valve 358 to reduce the pressure of the air to a desired pressure. The air then flows from the pressure reducing valve 358 through the orifice 360 which constrains the passage of the air so that a desired flow rate of air enters the metal tube 350. The air flows through the tube 350 and into the headlight enclosure 334. The air then flows through the enclosure 334 and out of the enclosure through the air exit to 357. As the air flows through the enclosure 334 the air heats up thereby removing the heat generated by the headlights 336. Positioning the air entry tube 350 above the headlights and the air exit tube 357 below the headlights causes the air to flow over the headlights 336 which improves the heat transfer.

Figure 13:
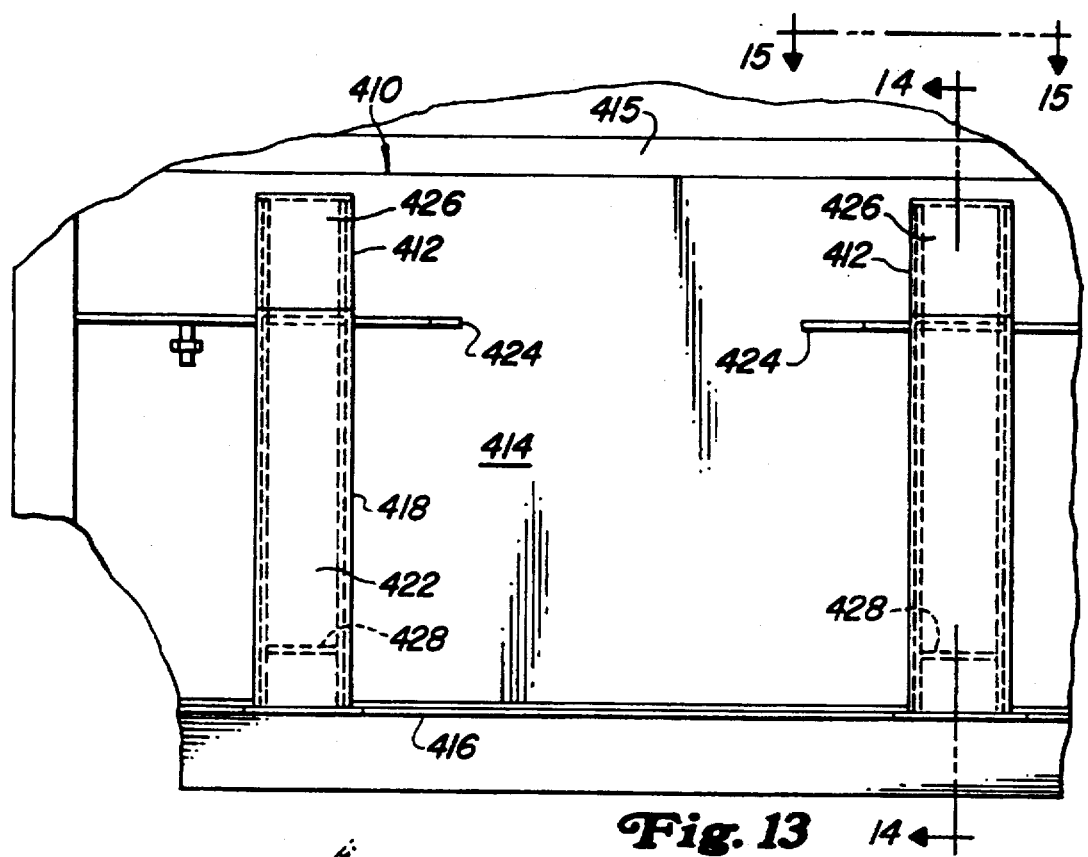
FIG. 13 is an enlarged partial elevation, with parts broken away, of the front end of the locomotive of FIG. 2.
Figure 14:
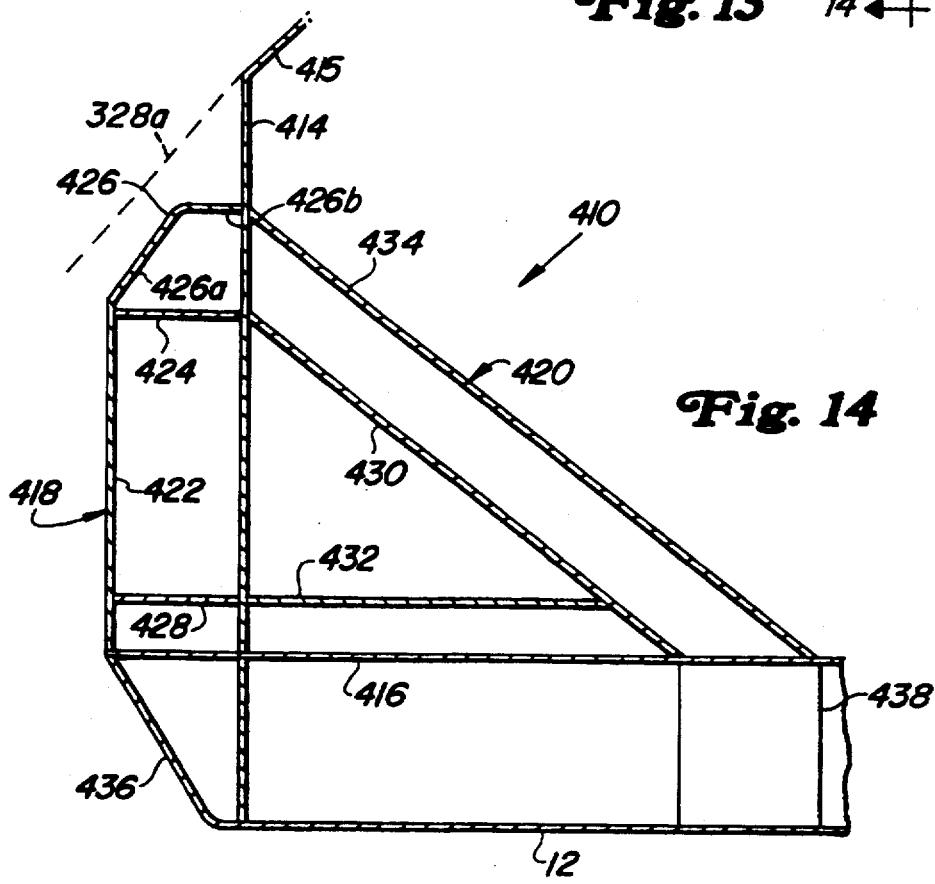

Referring to FIG. 2, below the headlight assembly, the locomotive 10 includes a collision post assembly 410. Referring to FIGS. 13 and 14 the collision post assembly 410 includes a pair of collision posts 412. Both of which are connected to a vertical front plate 414 which is rigidly attached to an upper deck 416 forming part of the platform 12 of the locomotive 10. The upper edge of the front plate 414 is rigidly attached, preferably by welding, to a frontal operator's cab plate 415 which extends about the front of the operator's cab compartment 130 and is in turn, rigidly connected to the structural system of the carbody 18.

The collision post 412 includes a front section 418 which is rigidly attached to the upper deck 414 and the front surface of the front plate 414 and a rear section 420 which is rigidly attached to the upper deck 416 and the rear surface of the front plate.

Figure 15:
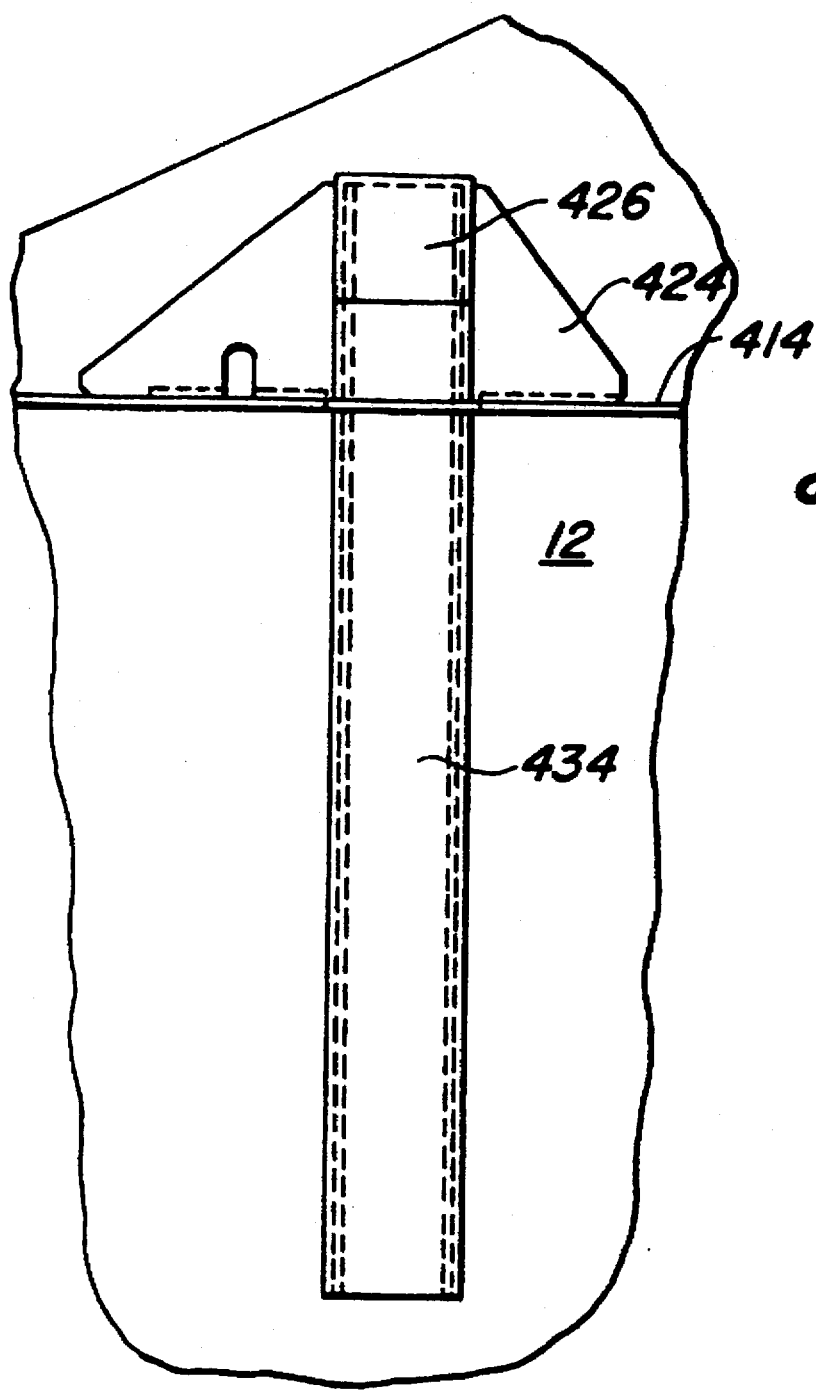
FIG. 15 is a top plan view taken in the direction generally indicated by line 15—15 in FIG. 13.

The front section 418, has a vertical, generally planar plate 422 which extends generally parallel to the front plate 414. A horizontal plate 424 connects the top end of the vertical plate 422 to the front plate 414. Best shown in FIG. 15, the horizontal plate 424 is generally planar and frustro-triangular shaped with base 424b attached to the front plate 414. The frustroconical shape of the horizontal plate 424 causes any collision forces exerted on the front section 418 to be distributed horizontally over the front plate 414.

Referring to FIGS. 13 and 14, the front section 418 also includes a cap 426 having a lower section 426a which is rigidly attached to the top end of the vertical plate 422 and rearwardly inclined to follow the contour of the upper section 328a of the nosepiece 328. An upper section 426b of the cap 426 is generally horizontal and rigidly attached to the front surface of the front plate 414.

The front section 418 further includes a lower upside down U-shaped channel 428 which is rigidly attached to and horizontally extends from the base of the vertical plate 422 to the front plate 414. Both sides of the channel 428 are also attached to the upperdeck 416 along the length of the channel.

The rear section 420 of the collision post 412 includes an inclined, generally planar frontal piece 430 which is rigidly attached to the front plate 414 directly opposite the point of attachment of the horizontal plate 424 to the front plate. The frontal piece 430 is downwardly inclined and rigidly attached to the upperdeck 416.

Horizontally aligned with the front channel 428 and attached to the rear surface of the front plate 414 directly opposite the front channel 428 is a U-shaped rear channel 432 similar to the front channel. The rear channel 432 extends horizontally from the front plate 414 to the front inclined piece 430 to which the rear channel is rigidly attached. Both sides of the rear channel 432 are rigidly attached to the upper deck 416 along the length of the channel.

The rear section 420 also includes a generally planar rear piece 434 which is downwardly inclined parallel to the frontal inclined piece 430. The rear piece 434 is rigidly attached to the front plate 414 directly opposite the attachment of the upper section 426b of the cap 426 to the frontal plate. Also, the lower end of the rear piece 434 is rigidly attached to the upper deck 416.

By attaching the rear channel 432, rear inclined piece 434 and frontal inclined piece 430 to the front plate 414 directly opposite the attachment of the front channel 428, horizontal plate 424 and cap 426, respectively, to the front plate 414, collision forces applied to the front section 418 are transferred through the front plate 414 to the rear section 420. Therefore, the thickness of the front plate 414 and frontal section 418 may be reduced to save weight.

In addition, the rear section 420 provides lateral support for the front plate 414 and front section 418 to allow the front section to have less bulk and therefore weigh less while retaining sufficient strength to withstand potential collision forces.

Also, by rigidly attaching the frontal section 418 and the rearward section 420 to the front plate, and also rigidly attaching the front plate to the operator's cab frontal plate 415, the frontal section, rearward section, operator's cab plate 415 and front plate act as a unitary piece. Thus, a localized collision force applied to either the frontal section 418 or front plate 414 is divided and transferred to the platform 12 and sidewalls 20 by the cab plate 415 and frontal and rearward section.

To further strengthen the collision post 410, the collision post is configured and attached to the upper deck 416 of the platform 12 so that the vertical plate 422 is attached to the upper deck vertically opposite from the attachment of a frontal piece 436 of the platform. Similarly, the rear inclined piece 434 is attached to the upper deck 416 vertically opposite from the attachment of a vertical support plate 438 of the, platform 12. Thus, the platform 12 is selectively supported in locations at which collision forces are transferred to the platform to prevent deformation of the platform from the collision forces.

A specific embodiment of the novel locomotive according to the present invention has been described for the purposes of illustrating the manner in which the invention may be made and used. It should be understood that implementation of other variations and modifications of the invention in its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

We claim:

1. A window assembly on a locomotive including a longitudinally extending platform and at least one generally vertical sidewall attached to and extending along at least a portion of the side of the platform, the sidewall forming an opening, the window assembly comprising:

a peripheral frame disposed in the opening in the sidewall, the peripheral frame including a first flange extending horizontally inward through the sidewall and a peripheral skirt attached to the first flange and extending outward from the first flange and overlapping in a non-contact manner with the exterior of the sidewall to form an interface between the skirt and the sidewall;

a plurality of positioning means attached about a first portion of the periphery of the peripheral frame, each positioning means contacting the sidewall for positioning the peripheral skirt relative to the sidewall so that the interface is a desired width, the positioning means including means for allowing limited relative movement between the peripheral skirt and the sidewall; and sealing means disposed within the interface for environmentally sealing the interface during the limited relative movement between the skirt and the sidewall.

2. The window assembly of claim 1 including
   fastening means for rigidly attaching a second portion of the periphery of the peripheral flange to the sidewall.

3. The window assembly of claim 1 wherein the positioning means includes; at least one tap block rigidly attached to one of the peripheral skirt and the peripheral frame, and
   at least one angled piece having a lower section removably attached to the at least one tap block and an upper section contacting an inner surface of said sidewall to position the peripheral skirt relative to the sidewall.

4. The window assembly of claim 1 wherein the sealing means is a non-rigid sealing compound.

5. The window assembly of claim 1 wherein the second portion is a portion of the bottom side of the periphery of the peripheral flange.

* * * * *